US010208627B2

(12) United States Patent
Heard et al.

(10) Patent No.: US 10,208,627 B2
(45) Date of Patent: Feb. 19, 2019

(54) COMBUSTOR ASSEMBLY LIFT SYSTEMS

(71) Applicant: General Electric Company, Schenectady, NY (US)

(72) Inventors: Ansley Michelle Heard, Greenville, SC (US); Stuart Craig Hanson, Anderson, SC (US); Jereld Alan Meiers, Piney Flats, TN (US); Kyle Joseph Banwart, West Bend, IA (US)

(73) Assignee: General Electric Company, Schenectady, NY (US)

( * ) Notice: Subject to any disclaimer, the term of this patent is extended or adjusted under 35 U.S.C. 154(b) by 554 days.

(21) Appl. No.: 14/964,806

(22) Filed: Dec. 10, 2015

(65) Prior Publication Data

US 2017/0167299 A1 Jun. 15, 2017

(51) Int. Cl.

| | |
|---|---|
| ***B23P 15/00*** | (2006.01) |
| ***F01D 25/28*** | (2006.01) |
| ***F23R 3/46*** | (2006.01) |
| ***B66F 3/36*** | (2006.01) |
| ***B66F 7/28*** | (2006.01) |
| ***F01D 9/02*** | (2006.01) |

(52) U.S. Cl.

CPC .............. *F01D 25/285* (2013.01); *B66F 3/36* (2013.01); *B66F 7/28* (2013.01); *F01D 9/023* (2013.01); *F23R 3/46* (2013.01); *F05D 2230/68* (2013.01); *F05D 2230/70* (2013.01); *F05D 2230/72* (2013.01); *F05D 2260/02* (2013.01); *F23R 2900/00017* (2013.01); *F23R 2900/00019* (2013.01)

(58) Field of Classification Search

CPC . B23Q 1/00; B23Q 1/03; B23Q 1/262; B23Q 1/25; B23Q 1/282; B23Q 3/06

See application file for complete search history.

(56) References Cited

U.S. PATENT DOCUMENTS

| | | | | |
|---|---|---|---|---|
| 2,930,492 | A | 3/1960 | Metcalf | |
| 2,991,669 | A * | 7/1961 | Stock | B25B 5/003 269/135 |
| 3,939,764 | A * | 2/1976 | McCormack | B27F 7/155 100/100 |
| 4,753,419 | A | 6/1988 | Johansson | |
| 5,816,568 | A * | 10/1998 | Fox | B25B 5/14 269/60 |
| 5,911,680 | A | 6/1999 | Takeoka | |
| 5,921,075 | A | 7/1999 | Shimoyama et al. | |
| 6,367,788 | B1 * | 4/2002 | Babchuk | B23K 37/0443 269/45 |

(Continued)

OTHER PUBLICATIONS

Extended European Search Report and Opinion issued in connection with corresponding EP Application No. 16202218.0 dated May 3, 2017.

*Primary Examiner* — Lee D Wilson

(74) *Attorney, Agent, or Firm* — Ernest G. Cusick; Frank A. Landgraff

(57) ABSTRACT

A combustor assembly lift system comprises a track that extends in at least a longitudinal direction, a lift arm moveably engaged with the track such that it can traverse along the track in at least the longitudinal direction, and a combustor assembly engagement frame connected to the lift arm, wherein the combustor assembly engagement frame is configured to temporarily secure to at least a portion of a combustor assembly.

18 Claims, 3 Drawing Sheets

(56) References Cited

U.S. PATENT DOCUMENTS

| | | | | |
|---|---|---|---|---|
| 7,779,540 | B2 | 8/2010 | McCaffrey et al. | |
| 2014/0123656 | A1 | 5/2014 | Sancewich et al. | |
| 2014/0123680 | A1 | 5/2014 | Sancewich et al. | |
| 2014/0215800 | A1 | 8/2014 | Griese et al. | |
| 2015/0144761 | A1 | 5/2015 | Davi et al. | |
| 2015/0147151 | A1* | 5/2015 | Mogle, II ................ | B25B 11/02 414/800 |
| 2017/0167299 | A1* | 6/2017 | Heard ................... | F01D 25/285 |

* cited by examiner

COMBUSTOR ASSEMBLY LIFT SYSTEMS

BACKGROUND OF THE INVENTION

The subject matter disclosed herein relates to combustor assemblies and, more specifically, to systems for installing and removing combustor assemblies with respect to a gas turbine.

Gas turbines can include a compressor section, a combustion section, and a turbine section. The compressor section pressurizes air flowing into the turbine. The pressurized air discharged from the compressor section flows into the combustion section, which is generally characterized by a plurality of combustors. Each of the plurality of combustors includes a combustion liner, which defines the combustion chamber of the combustor. As such, air entering each combustor is mixed with fuel and combusted within the combustion liner. Hot gases of combustion flow from the combustion liner through a transition piece to the turbine section of the gas turbine to drive the turbine and generate power More specifically, a gas turbine combustor mixes large quantities of fuel and compressed air and burns the resulting mixture. Combustors for industrial gas turbines can include an annular array of cylindrical combustion “cans” in which air and fuel are mixed and combustion occurs. Compressed air from an axial compressor flows into the combustor. Fuel is injected through fuel nozzle assemblies that extend into each can. The mixture of fuel and air burns in a combustion chamber of each can. The combustion gases discharge from each can into a duct that leads to the turbine.

In some embodiments, combustor assemblies designed for low emissions, may include premix chambers and combustion chambers. Fuel nozzle assemblies in each combustor assembly inject fuel and air into the chambers of the can. A portion of the fuel from the nozzle assembly is discharged into the premix chamber of the can, where air is added to and premixed with the fuel. Premixing air and fuel in the premix chamber promotes rapid and efficient combustion in the combustion chamber of each can, and low emissions from the combustion. The mixture of air and fuel flows downstream from the premix chamber to the combustion chamber which supports combustion and under some conditions receives additional fuel discharged by the front of the fuel nozzle assembly. The additional fuel provides a means of stabilizing the flame for low power operation, and may be completely shut off at high power conditions.

Combustor assemblies need to be installed during the initial build of the gas turbine and may subsequently be removed during subsequent maintenance activities. However, to install, remove or re-install a combustor assembly, a significant amount of force may be required to properly lift, position and/or align the combustor assembly with respect to the combustor assembly. Accordingly, alternative systems for installing and removing combustor assemblies with respect to a gas turbine would be welcome in the art.

BRIEF DESCRIPTION OF THE INVENTION

In one embodiment, a combustor assembly lift system comprises a track that extends in at least a longitudinal direction, a lift arm moveably engaged with the track such that it can traverse along the track in at least the longitudinal direction, and a combustor assembly engagement frame connected to the lift arm, wherein the combustor assembly engagement frame is configured to temporarily secure to at least a portion of a combustor assembly.

In another embodiment, a combustor assembly lift system comprises a track that extends in at least a longitudinal direction, a support arm moveably engaged with the track such that it can traverse along the track in at least the longitudinal direction, a lift arm connected to the support arm, and a combustor assembly engagement frame connected to the lift arm, wherein the combustor assembly engagement frame is configured to temporarily secure to at least a portion of a combustor assembly.

These and additional features provided by the embodiments discussed herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the inventions defined by the claims. The following detailed description of the illustrative embodiments can be understood when read in conjunction with the following drawings, where like structure is indicated with like reference numerals and in which:

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers’ specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles “a,” “an,” “the,” and “said” are intended to mean that there are one or more of the elements. The terms “comprising,” “including,” and “having” are intended to be inclusive and mean that there may be additional elements other than the listed elements.

Figure 1:
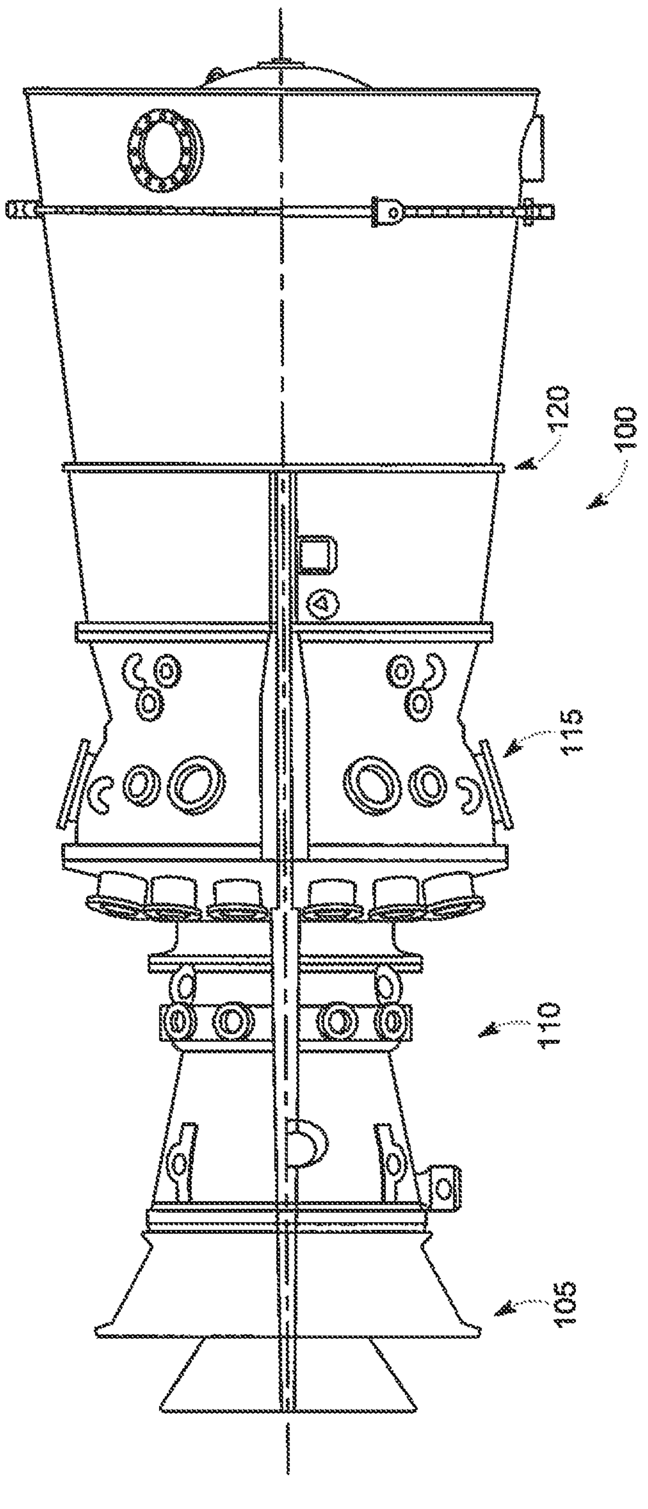
FIG. 1 is a side view of a turbomachine according to one or more embodiments shown or described herein.

Referring now to FIG. 1, some turbomachines, such as gas turbines, aero-derivatives, or the like, burn a fuel and an air mixture during a combustion process to generate energy. FIG. 1 illustrates an example of a turbomachine 100. Generally, the turbomachine 100 comprises an inlet plenum 105 that directs an airstream towards a compressor housed in a compressor casing 110. The airstream is compressed and then discharged to a combustion system 115, where a fuel, such as natural gas, is burned to provide high-energy combustion gases, which drives the turbine section 120. In the turbine section 120, the energy of the hot gases is converted into work, some of which is used to drive the compressor, with the remainder available for useful work to drive a load such as the generator, mechanical drive, or the like (none of which are illustrated).

Figure 2:
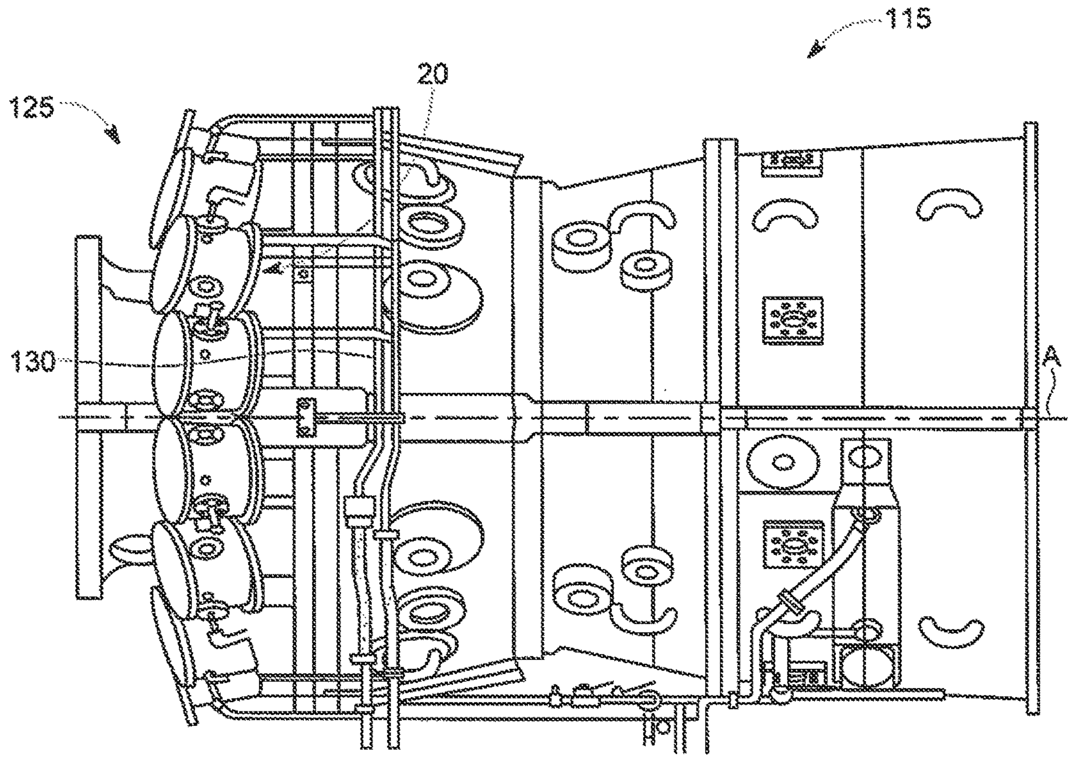
FIG. 2 is a side view of a combustion system according to one or more embodiments shown or described herein.

Referring now additionally to FIG. 2, an embodiment of the combustion system 115 may comprise at least one combustor assembly 20. Some turbomachines 100, such as that illustrated in FIG. 2, may comprise a plurality of combustor assemblies 20 disposed in an annular array around a central axis A. Generally, within each of combustor assembly 20 the aforementioned combustion process occurs. In some embodiments, combustor assemblies 20 can comprise one or more auxiliary systems 130 such as flame detection systems to monitor the flame burning in some of the combustor assemblies 20. Such flame detection systems may be in the form of a flame scanner, a portion of which may be inserted within the combustor assembly 20. Additional or alternative auxiliary systems 130 may similarly be incorporated into combustor assemblies 20 to monitor, control and/or impact one or more of the combustor assembly processes.

Figure 3:
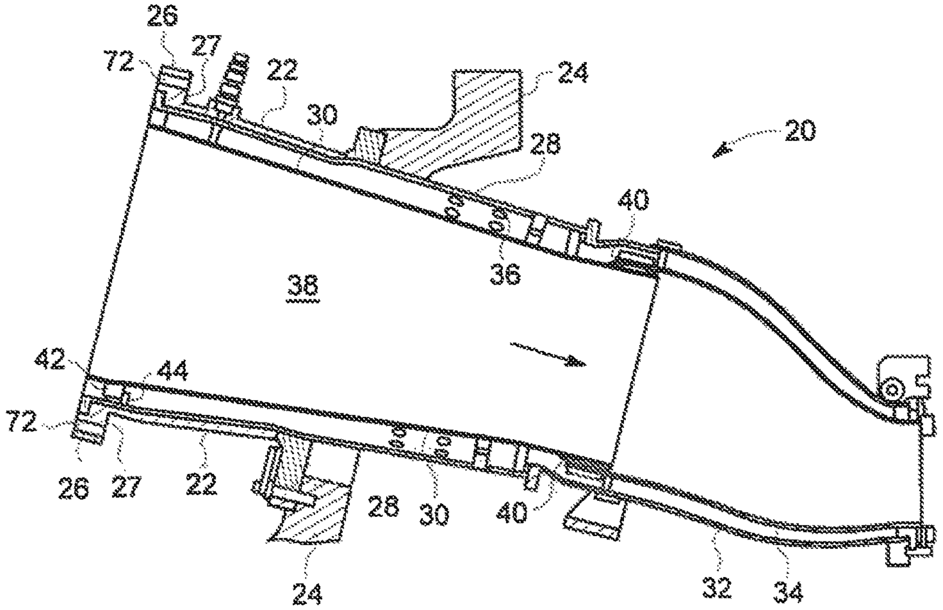
FIG. 3 is a cross-sectional side view of a combustor assembly according to one or more embodiments shown or described herein; and, FIG. 4 is a perspective view of a combustor assembly lift system according to one or more embodiments shown or described herein.

Referring additionally to FIG. 3, a cross-sectional side view of an embodiment of a combustor assembly 20 of a turbomachine 100 is illustrated. The combustor assembly 20 may generally include at least a combustion can 125 and potentially a substantially cylindrical combustion casing 22 secured to a portion of a gas turbine casing 24, such as a compressor discharge casing or a combustion wrapper casing. As shown, a flange 26 may extend outwardly from an upstream end of the combustion casing 22. The flange 26 may generally be configured such that an end cover assembly of a combustor assembly 20 may be secured to the combustion casing 22. For example, the flange 26 may define a plurality of flange holes 72 for attaching the end cover assembly to the combustion casing 22.

In some embodiments, the combustor assembly 20 may also include an internal flow sleeve 28 and/or a combustion liner 30 substantially concentrically arranged within the flow sleeve 28. The combustor assembly 20 may comprise a unibody combustor assembly 20 comprising the combustion can 125 and at least one of the flow sleeve 28 or combustion liner 30 connected to the combustion can 125 as a single pre-assembled structure, or the combustor assembly 20 may comprise an assembly where the combustion can 125, flow sleeve 28 and combustion liner 30 all connect directly to the turbomachine 100 such as to the turbine casing 24 (sometimes referred to as a combustion discharge casing or "CDC"). For example, the flow sleeve 28 and the combustion liner 30 may extend, at their downstream ends, to a double walled transition duct, including an impingement sleeve 32 and a transition piece 34 disposed within the impingement sleeve 32. It should be appreciated that in some embodiments the impingement sleeve 32 and the flow sleeve 28 may be provided with a plurality of air supply holes 36 over a portion of their surfaces, thereby permitting pressurized air from the compressor section 12 to enter the radial space between the combustion liner 30 and the flow sleeve 28.

The combustion liner 30 of the combustor assembly 20 may generally define a substantially cylindrical combustion chamber 38, wherein fuel and air are injected and combusted to produce hot gases of combustion. Additionally, the combustion liner 30 may be coupled at its downstream end to the transition piece 34 such that the combustion liner 30 and the transition piece 34 generally define a flow path for the hot gases of combustion flowing from each combustor assembly 20 to the turbine section 16 of the turbine assembly 10.

In some embodiments, such as that illustrated in FIG. 3, the transition piece 34 may be coupled to the downstream end of the combustion liner 30 with a seal 40 (e.g., a compression seal). For example, the seal 40 may be disposed at the overlapping ends of the transition piece 34 and combustion liner 30 to seal the interface between the two components. For example, a seal 40 may comprise a circumferential metal seal configured to be spring/compression loaded between inner and outer diameters of mating parts. It should be appreciated, however, that the interface between the combustion liner 30 and the transition piece 34 need not be sealed with a compression seal 40, but may generally be sealed by any suitable seal known in the art.

In some embodiments, the combustion liner 30 may also include one or more male liner stops 42 that engage one or more female liner stops 44 secured to the flow sleeve 28 or, in combustor assemblies 20 without a flow sleeve 28, the combustion casing 22. In particular, the male liner stops 42 may be adapted to slide into the female liner stops 44 as the combustion liner 30 is installed within the combustor assembly 20 to indicate the proper installation depth of the combustion liner 30 as well as to prevent rotation of the liner 30 during operation of the turbine assembly 10. Moreover, it should be appreciated that, in some embodiments, male liner stops 42 may be additionally or alternatively disposed on the flow sleeve 28 or combustion casing while the female liner stops 44 are disposed on the combustion liner 30.

In some embodiments, the combustion liner 30 may first be installed within a combustor assembly 20, by being pushed into the combustor assembly 20. For example, the combustion liner 30 can be pushed into the combustor assembly 20 until a force limits further installation depth into the transition piece 34. With continued reference to FIG. 2, a combustion can 125 can then be installed into each respective combustor assembly 20. Specifically, the combustion can 125 can be positioned, aligned and inserted such that its end cover assembly abuts against the flange 26 of the combustor assembly 20.

While specific embodiments have been presented herein, it should be appreciated that the combustor assembly 20 may comprise a variety of different components that are assembled in a variety of different orders with respect to the individual connections made with the turbomachine 100. For example, the combustor assembly 20 may be completely assembled prior to installation onto the turbomachine 100 (e.g., a unibody combustor assembly 20), may be partly assembled prior to installation on the turbomachine 100, may be completely assembled while connected to the turbomachine 100, or combinations thereof With additional reference to FIG. 4, the combustor assembly lift system 200 can be provided to help transport, lift, install and remove the combustor assembly 20 with respect to the combustor assembly 20 of the turbomachine 100. Specifically, the combustor assembly lift system 200 can enable the movement of the combustor assembly 125 throughout the site of a turbomachine (such as from where the combustor assembly may be received in a shipping container to the location of the turbomachine 100) in addition to assist with positioning and alignment during combustor assembly 20 installation or removal. The relatively low profile of the combustor assembly lift system 200 and its position on a floor under the turbomachine 100, may also facilitate the installation or removal of combustor assemblies 20 at the lower positions of the turbomachine 100 (i.e., the combustor assemblies 20 installed on the lower half of the turbomachine 100 or those most proximate the six o'clock position).

The combustor assembly lift system 200 can generally comprise a track 210, a lift arm 220 moveably engaged with the track 210, and a combustor assembly engagement frame 240 connected to the lift arm 220. The lift arm 220 may be moveably engaged with the track 210 via a direct connection or an intermediate connection. For example, in some embodiments, the lift arm 220 may be moveably engaged with the track 210 via a support arm 230. In these embodiments, the support arm 230 may be moveably engaged with the track 210 and the lift arm 220 may be connected to the support arm 230. These and other features can be configured alone or in combination in a variety of configurations to help facilitate the overall transportation, lifting, alignment, installation and/or removal of one or more combustor assemblies 20 with respect to one or more combustor assemblies 20 of a turbomachine 100.

Figure 4:
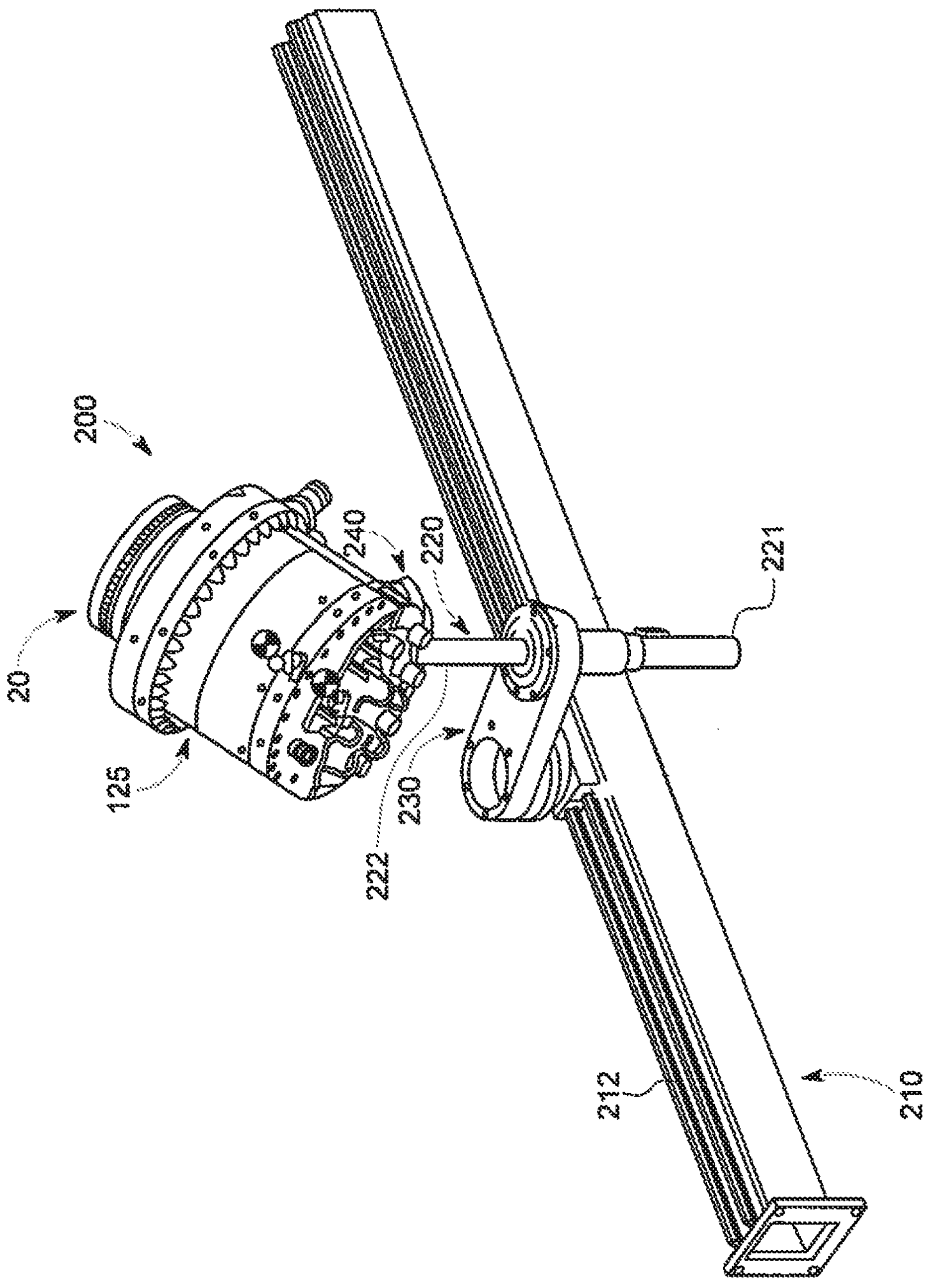

Referring now to FIG. 4, the track 210 can comprise any path that can support and direct the movement of an engaged lift arm 220 with a combustor assembly 20 temporarily secured thereto. For example, the track 210 may comprise a rail 212 for which the lift arm 220 (and/or a separate support arm 230) can ride along. In some embodiments, the track 210 may comprise additional or alternative configurations such as conveyor type systems, rack and pinion type systems, pulley type systems, or simple bounded paths that restrict the movement of the lift arm 220 and/or support arm 230 in a direction that deviates from the direction of the track 210.

The track 210 can extend at least in a longitudinal direction as illustrated in FIG. 4. In some embodiments, the track 210 may extend in the longitudinal direction and a pure linear path. For example, the longitudinal direction of the track 210 may run perpendicular with respect to the turbomachine 100 such that it extends across the face of the various slots for the combustor assemblies 20 (i.e., the track 210 extends in a direction that is perpendicular to the length of the turbomachine 100). Such embodiments may allow the lift arm 220 to move along the track 210 when transitioning from slot to slot on the turbomachine 100 to install multiple combustor assemblies 20.

However, in some embodiments, at least a portion of the track may extend along a non-linear path such as a curved, bent, or serpentine path. In such embodiments, the track 210 may be able to navigate other obstructions or accommodate for longer travel distances to facilitate movement of the combustor assembly 20 to and from the turbomachine 100, shipment arrival location, or other points of interest (e.g., servicing location, inspection location, or the like).

In even some embodiments, the track 210 may comprise a junction that splits into at least two directions. For example, the track 210 may comprise a junction that splits into two directions, wherein a first direction extends towards a first turbomachine, and wherein a second direction extends towards a second turbomachine. Alternatively or additionally, the track 210 may comprise a junction that splits into two directions, wherein a first direction extends towards a first slot of a turbomachine 100 for a first combustor assembly 20, and wherein a second directions extends towards a second slot on the same turbomachine 100 for a second combustor assembly 20. It should be appreciated that the track 210 may thereby comprise any variety of path directions and any number of junctions to provide any suitable track configuration. Tailoring the configuration of the track 210 may thereby facilitate the delivery of one or more combustor assemblies 20 to one or more locations while limiting or eliminating the need for additional cranes, lifts or other devices to move the respective combustor assemblies 20.

In some embodiments, the track 210 may be secured to the floor. Such embodiments may facilitate the delivery of the combustor assemblies in a low profile suitable for installation at the lower positions of the turbomachine 100. In some embodiments, the track 210 may be elevated such as being secured to one or more poles, ceilings or other locations to facilitate the delivery of combustor assemblies 20 to one or more higher locations. In such embodiments, the combustor assemblies 20 may even hang from the support arm 230 to facilitate installation at the higher positions of the turbomachine 100.

While various configurations of the track 210 have been discussed herein, it should be appreciated that these are exemplary only and not intended to be limiting. Any other additional or alternative configuration of the track 210 may also be realized that is suitable for the combustor assembly lift system 200.

Still referring to FIG. 4, the combustor assembly lift system 200 further comprises a lift arm 220. The lift arm 220 can be moveably engaged (either directly or indirectly) with the track 210 such that it can traverse along the track 210 in at least the longitudinal direction (and potentially any other direction in which the track 210 extends). The lift arm 220 can also be strong enough to support a combustor assembly 20 temporarily secured to the combustor assembly engagement frame 240 connected to the lift arm 220 while the lift arm 220 traverses along the track 210.

The moveable engagement between the lift arm 220 and the track 210 may be achieved through any suitable configuration. For example, in embodiments where the track 210 comprises one or more rails 212, the lift arm 220 may comprise one or more wheels that ride along the one or more rails 212. In other embodiments, the lift arm 220 may be moveably engaged with the track 210 through any additional or alternative configuration such as by using ball bearings, wheels, disks, rollers, clamps, grips or the like.

In some embodiments, the lift arm 220 may further be rotatably connected to the track 210 such that the lift arm 220 may rotate with respect to the track 210. The rotational connection may enable rotation about any axis or axes to help facilitate rotational orientation between the combustor assembly 20 and its respective slot on the turbomachine 100. The rotational connection can be facilitated through any suitable configuration such as, but not limited to, a rotatable pin, bolt, screw or ball-and-socket connecting the lift arm 220 to the track 210.

In some embodiments, the lift arm 220 is moveably engaged with the track 210 via a support arm 230. The support arm 230 can comprise any additional arm or extension that intermediates the connection between the track 210 and the lift arm 220. For example, the support arm 230 itself may be moveably engaged with the track 210 while the lift arm 220 is connected to the support arm 230 via a rigid, rotatable or moveable connection.

The support arm 230 may extend in a direction away from the track 210 to help position the combustor assembly 20 in place for installation or removal while avoiding the potential encumbrance of the track 210. The support arm may also be moveable, rotatable, expandable or otherwise adjustable to provide for additional positional adjustments of the combustor assembly 20. Such additional adjustability may help facilitate proper alignment of a combustor assembly 20 with a single slot on the turbomachine 100, or may even allow for a single track 210 to be used for the installation of multiple combustor assemblies 20 on multiple slots of the turbomachine 100 with no additional repositioning of the track 210.

In embodiments where the track 210 comprises one or more rails 212, the support arm 230 may comprise one or more wheels that ride along the one or more rails 212. In other embodiments, the support arm 230 may be moveably engaged with the track 210 through any additional or alternative configuration such as by using ball bearings, wheels, disks, rollers, clamps, grips or the like.

In some embodiments, the support arm 230 may further be rotatably connected to the track 210 such that the support arm 230 may rotate with respect to the track 210. The rotational connection may help facilitate rotational orientation between the combustor assembly 20 and its respective slot of the turbomachine 100. The rotational connection can be facilitated through any suitable configuration such as, but not limited to, a rotatable pin, bolt or screw connecting the support arm 230 to the track 210.

The lift arm 220 may be connected to the support arm 230 in a variety of configurations and at a variety of locations to facilitate the lifting and movement of a secured combustor assembly 20 such as for the removal or installation of said combustor assembly 20 with respect to a turbomachine 100. For example, in some embodiments, the lift arm 220 may be rotatably connected to the support arm 230 such that the lift arm 220 and the support arm 230 may rotate with respect to one another. The rotational connection may help facilitate rotational orientation between the combustor assembly 20 and its respective slot on the turbomachine 100. The rotational connection can be facilitated through any suitable configuration such as, but not limited to, a rotatable pin, bolt or screw connecting the lift arm 220 to the support arm 230.

The lift arm 220 may be connected to the support arm 230 at a variety of locations. For example, in some embodiments, such as that illustrated in FIG. 4, the lift arm 220 may be connected to an outer end of the support arm 230. Such embodiments may be particularly suitable for installing the combustor assembly 20 to the turbomachine 100 while avoiding the potential encumbrance of the track 210. Alternatively or additional, the lift arm 220 may be connected to any one or more locations on the support arm 230. In even some embodiments, the lift arm 220 may be connected to the support arm via a moveable connection such that the location of the lift arm on the support arm 230 may be adjusted The lift arm 220 itself can comprise a variety of shapes and configurations to facilitate the positional adjustment of the combustor assembly 20. For example, the lift arm 220 may be articulatable in a vertical direction. In some embodiments, the lift arm 220 may be articulatable via a manual system such as by using a releasable clamp to lock and release the position of the lift arm 220. In some embodiments, the lift arm may be articulatable via a powered lift. As used herein, powered lift refers to any non-manually driven lift such as, but not limited to, hydraulic lifts, pneumatic lifts and electric lifts. In some embodiments, the lift arm 220 may comprise a substantially linear lift arm such that the combustor assembly 20 may be moved in a substantially vertical direction. In other embodiments, the lift arm 220 may comprise a curved, bent or serpentine configuration to provide more of an offset of the combustor assembly 20 from the track or otherwise account for installation and/or removal requirements.

Still referring to FIG. 4, the combustor assembly lift system 200 can further comprise a combustor assembly engagement frame 240 connected to the lift arm 220 that is configured to temporarily secure to at least a portion of a combustor assembly 20.

The combustor assembly engagement frame 240 can comprise a variety of configurations to facilitate temporary securement to combustor assemblies 20. For example, in some embodiments, the combustor assembly engagement frame 240 may comprise a cradle configuration that can receive and support the combustor assembly 20. As used herein, cradle configuration can refer to any configuration that acts as an open support structure that the combustor assembly 20 may be lowered into and left in place. For example, the cradle configuration may comprise an open basket, lattice, cage, or other configuration to receive and support the combustor assembly 20. In some embodiments, the cradle configuration may comprise one or more open slots to accommodate one or more peripheral structures on the combustor assembly 20. Peripheral structures on the combustor assembly 20 include, for example, additional pipes, wires, or other external structures that can extend away from the body of the combustor assembly 20. The one or more open slots may allow for the peripheral structures to pass there through such that the main body of the combustor assembly 20 may come in contact with and rest directly on the combustor assembly engagement frame 240.

In some embodiments, the combustor assembly engagement frame 240 may comprise a clam shell configuration capable of transitioning between an open and a closed state to temporarily secure to the combustor assembly 20. More specifically, in such embodiments, the combustor assembly engagement frame 240 may comprise two or more portions that can at least partially pivot away from one another to rotate open or, alternatively, completely separate away from one another, to accept at least a portion of the combustor assembly 20. The combustor assembly engagement frame 240 may then close back together around the combustor assembly 20 to provide temporary securement of the combustor assembly 20.

In some embodiments, the combustor assembly engagement frame 240 may be configured to temporarily secure to at least a portion of the combustor assembly 20 via one or more bolts. For example, the combustor assembly engagement frame 240 may comprise a plurality of holes that may be aligned with corresponding holes on the combustor assembly 20. Once aligned, bolts may be passed through both sets of corresponding holes to temporarily secure the combustor assembly 20 to the combustor assembly engagement frame 240. Such embodiments may particularly facilitate the temporary securement of a combustor assembly 20 when the combustor assembly 20 hangs down below a track 210 such as when the track 210 is elevated for installing the combustor assembly 20 at a higher position of the turbomachine 100.

While particular embodiments of the combustor assembly engagement frame 240 have been disclosed herein to illustrate possible temporary securement configurations between the combustor assembly engagement frame 240 and the combustor assembly 20, it should be appreciated that these are exemplary only and not intended to be limiting. Additional or alternative configurations may also be realized to facilitate the temporary securement of the combustor assembly 20 to the combustor assembly engagement frame 240 of the combustor assembly lift system 200.

The combustor assembly engagement frame 240 may be connected to the lift arm 220 in a variety of configurations and at a variety of locations to facilitate the lifting and movement of a secured combustor assembly 20 such as for the removal or installation of said combustor assembly 20 with respect to a turbomachine 100. For example, in some embodiments, the combustor assembly engagement frame 240 may be rotatably connected to the lift arm 220 such that the combustor assembly engagement frame 240 and the lift arm 220 may rotate with respect to one another. The rotational connection may help facilitate rotational orientation between the combustor assembly 20 and its respective slot on the turbomachine 100. The rotational connection can be facilitated through any suitable configuration such as, but not limited to, a rotatable pin, bolt, screw or ball-and-socket connecting the combustor assembly engagement frame 240 to the lift arm 220.

The combustor assembly engagement frame 240 may be connected to the lift arm 220 at a variety of locations. For example, in some embodiments, such as that illustrated in FIG. 4, the combustor assembly engagement frame 240 may be connected to an upper end 222 of the lift arm 220. Such embodiments may be particularly suitable for installing the combustor assembly 20 at a lower position on the turbomachine 100. In some embodiments, the combustor assembly engagement frame 240 may be connected to a lower end 221 of the lift arm 220. Such embodiments may be particularly suitable for installing the combustor assembly 20 at a higher position on the turbomachine 100 and/or when the combustor assembly 20 hangs below the lift arm 220 and/or track 210. Alternatively or additional, the combustor assembly engagement frame 240 may be connected to any one or more locations on the lift arm 220 between the lower end 221 and the upper end 222. In even some embodiments, the combustor assembly engagement frame 240 may be connected to the lift arm 220 via a moveable connection such that the location of the combustor assembly engagement frame 240 on the lift arm 220 may be adjusted.

It should now be appreciated that combustor assembly lift systems as disclosed herein can be provided to help transport, lift, align, install, and remove combustor assemblies into combustor assemblies of turbomachines. Such combustor assembly lift systems can facilitate proper alignment specific to each combustor assembly while enabling a continuous transportation, installation and/or removal process via a single combustor assembly lift system. These combustor assembly lift systems may thereby provide for simpler and faster overall installation and removal activities.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A combustor assembly lift system comprising:

a track that extends in at least a longitudinal direction;

a support arm comprising a first end rotatably engaged with the track such that the support arm is enabled to traverse along the track in at least the longitudinal direction a lift arm moveably rotatably engaged with a second end of the support arm engaged that is engaged with the track such that the lift arm is enabled to rotatably traverse the track with the support arm as the support arm longitudinally traverses along the track in at least the longitudinal direction; and, a combustor assembly engagement frame connected to the lift arm, wherein the combustor assembly engagement frame is configured to temporarily secure to at least a portion of a combustor assembly.

2. The combustor assembly lift system of claim 1, wherein the lift arm comprises a vertical axis and the lift arm is articulatable only in a vertical direction in the lift arm's vertical axis.

3. The combustor assembly lift system of claim 2, wherein the lift arm is articulatable via powered lift.

4. The combustor assembly lift system of claim 1, wherein the lift arm comprises a linear lift arm.

5. The combustor assembly lift system of claim 1, wherein the support arm extends in a direction away from the track.

6. The combustor assembly lift system of claim 1, wherein the support arm is moveably engaged with the track via a rotatable connection such that the support arm that is enabled to also rotate with respect to the track.

7. A combustor assembly lift system comprising:

a track that extends in at least a longitudinal direction;

a support arm comprising a first end rotatably engaged with the track such that the support arm is enabled to traverse along the track in at least the longitudinal direction;

a lift arm moveably rotatably engaged with a second end of the support arm engaged that is engaged with the track such that the lift arm is enabled to rotatably traverse the track with the support arm as the support arm longitudinally traverses along the track in at least the longitudinal direction; and, a combustor assembly engagement frame connected to the lift arm, wherein the combustor assembly engagement frame is configured to temporarily secure to at least a portion of a combustor assembly wherein at least a portion of the track extends along a non-linear path.

8. The combustor assembly lift system of claim 1, wherein the track comprises a junction that splits into at least two directions.

9. The combustor assembly lift system of claim 1, wherein the track comprises a rail, and wherein the lift arm rides along the rails.

10. The combustor assembly lift system of claim 1, wherein the track is secured to a floor.

11. The combustor assembly lift system of claim 1, wherein the combustor assembly engagement frame is rotatably connected to the lift arm.

12. The combustor assembly lift system of claim 1, wherein the combustor assembly comprises a unibody combustor assembly comprising a combustion can and at least one of a flow sleeve or a combustion liner connected to the combustion can.

13. The combustor assembly lift system of claim 1, wherein the combustor assembly engagement frame comprises a cradle configuration that is enabled to receive and support the combustor assembly.

14. The combustor assembly lift system of claim 1, wherein the cradle configuration comprises one or more open slots to accommodate one or more peripheral structures on the combustor assembly.

15. A combustor assembly lift system comprising:

a track that extends in at least a longitudinal direction;

a support arm comprising a first end rotatably and moveably engaged with the track such that the support arm is enabled to traverse along the track in at least the longitudinal direction;

a lift arm connected to the support arm; the lift arm moveably rotatably engaged with a second end of the support arm engaged that is engaged with the track such that the lift arm is enabled to rotatably traverse the track with the support arm as the support arm longitudinally traverses along the track in at least the longitudinal direction and, a combustor assembly engagement frame connected to the lift arm, wherein the combustor assembly engagement frame is configured to temporarily secure to at least a portion of a combustor assembly.

16. The combustor assembly lift system of claim 15, wherein the support arm is moveably engaged with the track via a rotatable connection such that the support arm is enabled to also rotate with respect to the track.

17. The combustor assembly lift system of claim 15, wherein the lift arm is articulatable in a vertical direction.

18. The combustor assembly lift system of claim 15, wherein the combustor assembly engagement frame is rotatably connected to the lift arm.

* * * * *